United States Patent
Karia et al.

(10) Patent No.: US 11,977,837 B2
(45) Date of Patent: May 7, 2024

(54) CONSENT TO CONTENT TEMPLATE MAPPING

(71) Applicant: International Business Machines Corporation, Armonk, NY (US)

(72) Inventors: Jignesh K Karia, Mumbai (IN); Jitan S Chandanani, Mumbai (IN); Vishal Awal, Mumbai (IN); Dayama Pankaj Satyanarayan, Bangalore (IN); Mukundan Sundararajan, Bangalore (IN); Rahul Hundet, Hyderabad (IN); Neha Shah, Kolkata (IN); Sudip Dutta, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 17/124,553

(22) Filed: Dec. 17, 2020

(65) Prior Publication Data
US 2022/0198138 A1 Jun. 23, 2022

(51) Int. Cl.
*G06F 40/205* (2020.01)
*G06F 16/28* (2019.01)
*G06F 16/901* (2019.01)
*G06F 40/186* (2020.01)

(52) U.S. Cl.
CPC .......... *G06F 40/205* (2020.01); *G06F 16/285* (2019.01); *G06F 16/9024* (2019.01); *G06F 40/186* (2020.01)

(58) Field of Classification Search
None
See application file for complete search history.

(56) References Cited

U.S. PATENT DOCUMENTS

| 9,934,544 B1* | 4/2018 | Whitfield | G06Q 50/265 |
|---|---|---|---|
| 11,068,644 B1* | 7/2021 | Beiderman | G06F 40/174 |
| 2009/0012842 A1* | 1/2009 | Srinivasan | G06F 16/3344 |
| | | | 707/999.005 |
| 2012/0030760 A1* | 2/2012 | Lu | G06F 21/51 |
| | | | 726/23 |
| 2013/0173642 A1* | 7/2013 | Oliver | G06F 40/20 |
| | | | 707/756 |
| 2013/0218919 A1* | 8/2013 | Solonchev | G06F 16/958 |
| | | | 707/E17.014 |

(Continued)

OTHER PUBLICATIONS

"Consultation Paper on Unsolicited Commercial Communication", Telecom Regulatory Authority of India, Published Date: Sep. 14, 2017, 81 pages.

(Continued)

*Primary Examiner* — Howard Cortes
(74) *Attorney, Agent, or Firm* — Rachel M. Yadlosky

(57) ABSTRACT

A method, system, and computer program product for consent and content template mapping are provided. The method identifies a content type within a content template. A set of content categories is identified that is associated with the content type. One or more consent templates are identified as associated with one or more of the content type and the set of content categories. The content template is mapped to the one or more consent templates to generate a consent template graph. The method provides a multimedia message to a user based on a consent template associated with the user and the content template.

20 Claims, 7 Drawing Sheets

(56) References Cited

U.S. PATENT DOCUMENTS

| | | | |
|---|---|---|---|
| 2013/0262268 A1 | 10/2013 | Gromoll et al. | |
| 2015/0154382 A1* | 6/2015 | Buckley | G16H 40/20 |
| | | | 705/2 |
| 2015/0365420 A1* | 12/2015 | Kochhar | H04W 12/06 |
| | | | 726/6 |
| 2015/0379232 A1* | 12/2015 | Mainwaring | G16H 50/70 |
| | | | 705/2 |
| 2016/0070758 A1* | 3/2016 | Thomson | G16H 10/60 |
| | | | 707/781 |
| 2018/0102186 A1* | 4/2018 | Järvisalo | G06Q 10/06 |
| 2018/0150377 A1* | 5/2018 | Oberle | G06F 11/3604 |
| 2018/0181483 A1* | 6/2018 | Oberle | G06F 11/3688 |
| 2018/0218393 A1 | 8/2018 | Thies et al. | |
| 2019/0005210 A1* | 1/2019 | Wiederspohn | G06F 21/31 |
| 2019/0372770 A1 | 12/2019 | Xu et al. | |
| 2020/0073925 A1* | 3/2020 | Shapiro | G06F 40/186 |
| 2020/0201875 A1* | 6/2020 | Wu | G06F 16/9024 |
| 2020/0364358 A1* | 11/2020 | Karia | H04L 63/10 |
| 2020/0410617 A1* | 12/2020 | Wichern | G06Q 30/0185 |
| 2021/0019360 A1* | 1/2021 | Li | G06F 40/169 |
| 2021/0150052 A1* | 5/2021 | Garcia | G06Q 50/18 |
| 2021/0241316 A1* | 8/2021 | Smith | G06Q 30/0241 |
| 2021/0365807 A1* | 11/2021 | Ramsl | G06F 16/35 |
| 2021/0366065 A1* | 11/2021 | Zhou | G06F 40/56 |
| 2021/0383070 A1* | 12/2021 | Hunter | G06F 40/103 |
| 2022/0121811 A1* | 4/2022 | Norota | G06Q 10/06316 |
| 2022/0284312 A1* | 9/2022 | Brecque | G06F 16/9024 |
| 2022/0335553 A1* | 10/2022 | Chew | G06F 16/144 |

OTHER PUBLICATIONS

"Only with consent: TRAI relief for mobile subscribers from pesky calls, spam messages", Info-tech, Published Date: Jul. 19, 2018, 12 pages. https://www.thehindubusinessline.com/info-tech/only-with-consent-trai-relief-for-mobile-subscribers-from-pesky-calls-spam-messages/article244%e2%80%a6/.

TRILEGAL, The Telecom Commercial Communications Customer Preference Regulations, mondaq, Published Date: Sep. 7, 2018, 8 pages. https://www.mondaq.com/india/telecoms-mobile-cable-communications/732200/the-telecom-commercial-communications-customer-preference-regulations-2018.

Mell et al., "The NIST Definition of Cloud Computing", Recommendations of the National Institute of Standards and Technology, Special Publication 800-145, Sep. 2011, 7 pages.

\* cited by examiner

CONSENT TO CONTENT TEMPLATE MAPPING

BACKGROUND

Short message service (SMS) information distribution is performed by a wide variety of organizations. Subscribers to telecommunications service providers (TSP) often receive these messages as part of broad-based outreach operations. TSPs obtain some form of user consent prior to transmitting such SMS messages to enable users to allow or deny the communication. TSPs must then manage consent of the users to provide protection to users and control the varying degrees of relationships established between users and organizations attempting to contact them. Managing such permissions presents difficulties in maintaining suitable granularity as well as content specificity.

SUMMARY

According to an embodiment described herein, a computer-implemented method for consent and content template mapping is provided. The method identifies a content type within a content template. A set of content categories is identified that is associated with the content type. One or more consent templates are identified as associated with one or more of the content type and the set of content categories. The content template is mapped to the one or more consent templates to generate a consent template graph. The method provides a multimedia message to a user based on a consent template associated with the user and the content template.

According to an embodiment described herein, a system for consent and content template mapping is provided. The system includes one or more processors and a computer-readable storage medium, coupled to the one or more processors, storing program instructions that, when executed by the one or more processors, cause the one or more processors to perform operations. The operations identify a content type within a content template. A set of content categories is identified that is associated with the content type. One or more consent templates are identified as associated with one or more of the content type and the set of content categories. The content template is mapped to the one or more consent templates to generate a consent template graph. The operations provide a multimedia message to a user based on a consent template associated with the user and the content template.

According to an embodiment described herein, a computer program product for consent and content template mapping is provided. The computer program product includes a computer-readable storage medium having program instructions embodied therewith, the program instructions being executable by one or more processors to cause the one or more processors to identify a content type within a content template. A set of content categories is identified that is associated with the content type. One or more consent templates are identified as associated with one or more of the content type and the set of content categories. The content template is mapped to the one or more consent templates to generate a consent template graph. The computer program product provides a multimedia message to a user based on a consent template associated with the user and the content template.

DETAILED DESCRIPTION

Figure 1:
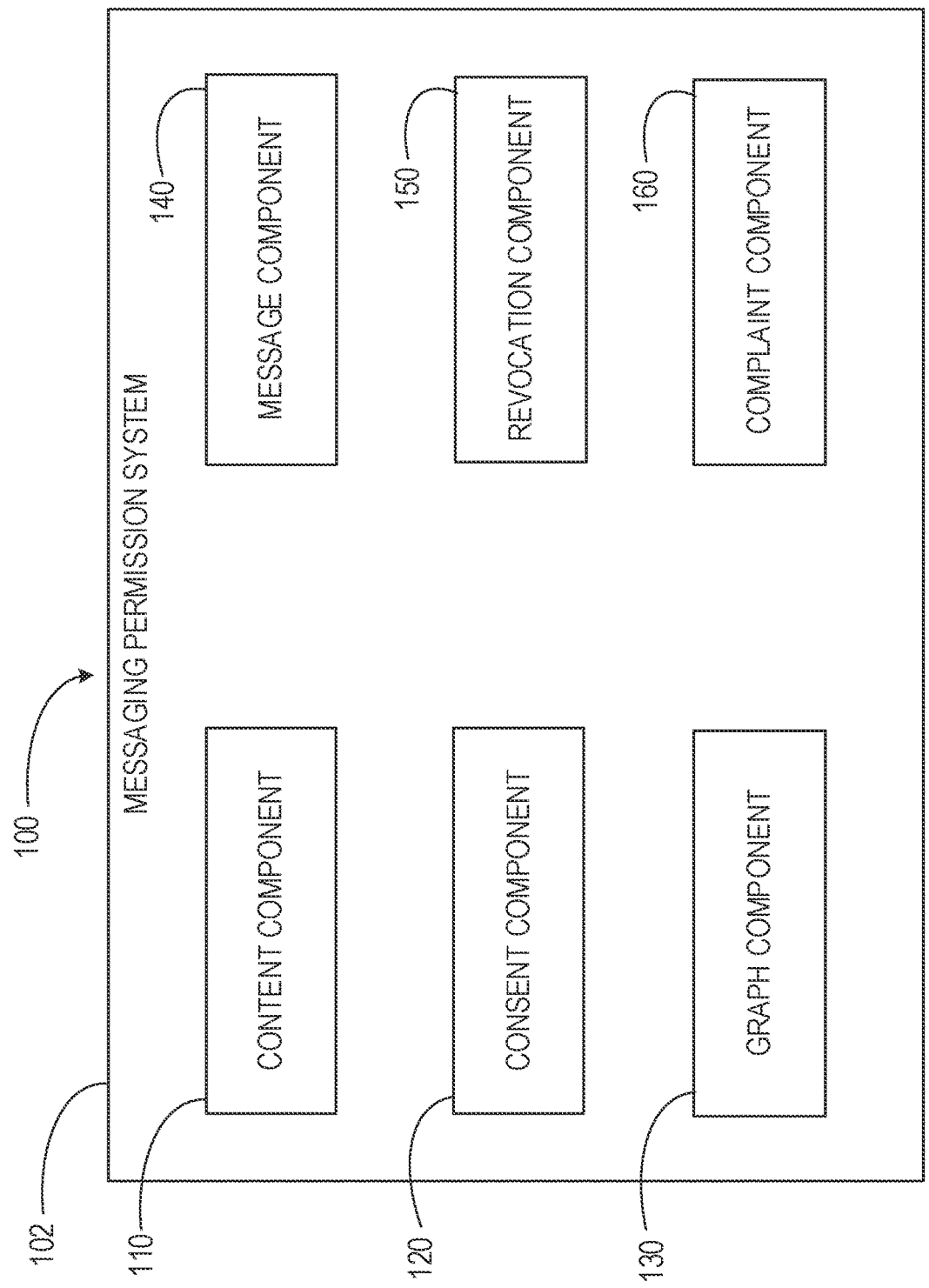
FIG. 1 depicts a block diagram of a computing environment for implementing concepts and computer-based methods, according to at least one embodiment.

The present disclosure relates generally to methods for consent and content template mapping. More particularly, but not exclusively, embodiments of the present disclosure relate to a computer-implemented method for generating templatized multimedia messages based on content and consent settings for a plurality of distinct recipients. The present disclosure relates further to a related system for consent and content template mapping, and a computer program product for operating such a system.

Organizations engage in large-scale messaging campaigns using SMS messaging. TSPs enable users or subscribers to consent to varying forms of these communications. Organizations may seek customer consent prior to transmitting or submitting SMS messages for transmission. Organizations may define templates of SMS messages to send TSP subscribers using TSP resources. Similarly, organizations may define consent templates to request user consent for messaging. Content and consent templates, either by organizations or TSPs, are often poorly managed. Responses to consent requests or templatized messages are often handled inadequate responses or action from either the TSPs or the organizations responsible for them.

Embodiments of the present disclosure enable content and consent-based management of SMS message campaigns. SMS messages transmitted using the present disclosure are scrubbed against current and revoked consents. Embodiments of the present disclosure enable generation of a knowledge graph and associated named entity recognition (NER) mapping. The knowledge graph contains different entities and relationships between them and recognizing terms. Embodiments of the present disclosure enable users to provide multiple consents across differing organizations and receive content tailored to those multiple consents. The multiple consents may vary in specificity from generic to specific, based on a proposal from a given organization and an acceptance of the user. Further, specificity of consents may be determined by one or more TSPs associated with the user or as specified by a regulatory body. Embodiments of the present disclosure may enable many-to-many mapping of consents and content of each new message sent. In some embodiments, TSPs verify messages to be sent against consents provided by users. Embodiments of the present disclosure enable users to revoke consents at any time for subsequently sent messages. Lists associated with customers may be immediately adjusted upon revocation of existing consents or acceptance of a new consent.

Embodiments of the present disclosure enable content templates to be used for generating content for transmission to users on behalf of an entity using consent templates. Consent templates may define boundaries of the communications between the user and entity, while content templates define messages generated for transmission to the user. Embodiments of the present disclosure enable automatic management of relationships between users and entities. Embodiments of the present disclosure enable addition of content templates related to consent templates in an automated fashion. Some embodiments of the present disclosure preclude entities from sending communications which are out of a scope of an approved consent template. For example, embodiments of the present disclosure may automatically remove permissions within consent templates of varying scope to preclude transmission of certain classes, types, or breadths of content. Embodiments of the present disclosure enable automatic mapping of new and existing content templates to one or more consent templates. Some embodiments of the present disclosure enable automatic updating of multiple consent records for a user based on revocation requests of a specified consent based on directed graphs. Embodiments of the present disclosure enable entities associated with consent templates to update some of the consent templates while retaining semantic meaning. Further, some embodiments of the present disclosure enable scrubbing of communications against multiple consent templates across a distributed ledger without revealing consent data.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a messaging permission system 102. The messaging permission system 102 may comprise a content component 110, a consent component 120, a graph component 130, a message component 140, a revocation component 150, and a complaint component 160. The content component 110 identifies content types within content templates and content categories. The consent component 120 identifies and inserts new consent templates within consent template graphs. The graph component 130 generates consent and content template graphs. The message component 140 generates and transmits multimedia messages from content templates and consent templates. The revocation component 150 revokes consent data associated with previously approved or accepted consent templates. The complaint component 160 processes complaints regarding consent and content templates. Although described with distinct components, it should be understood that, in at least some embodiments, components may be combined or divided, and/or additional components may be added without departing from the scope of the present disclosure.

Figure 2:
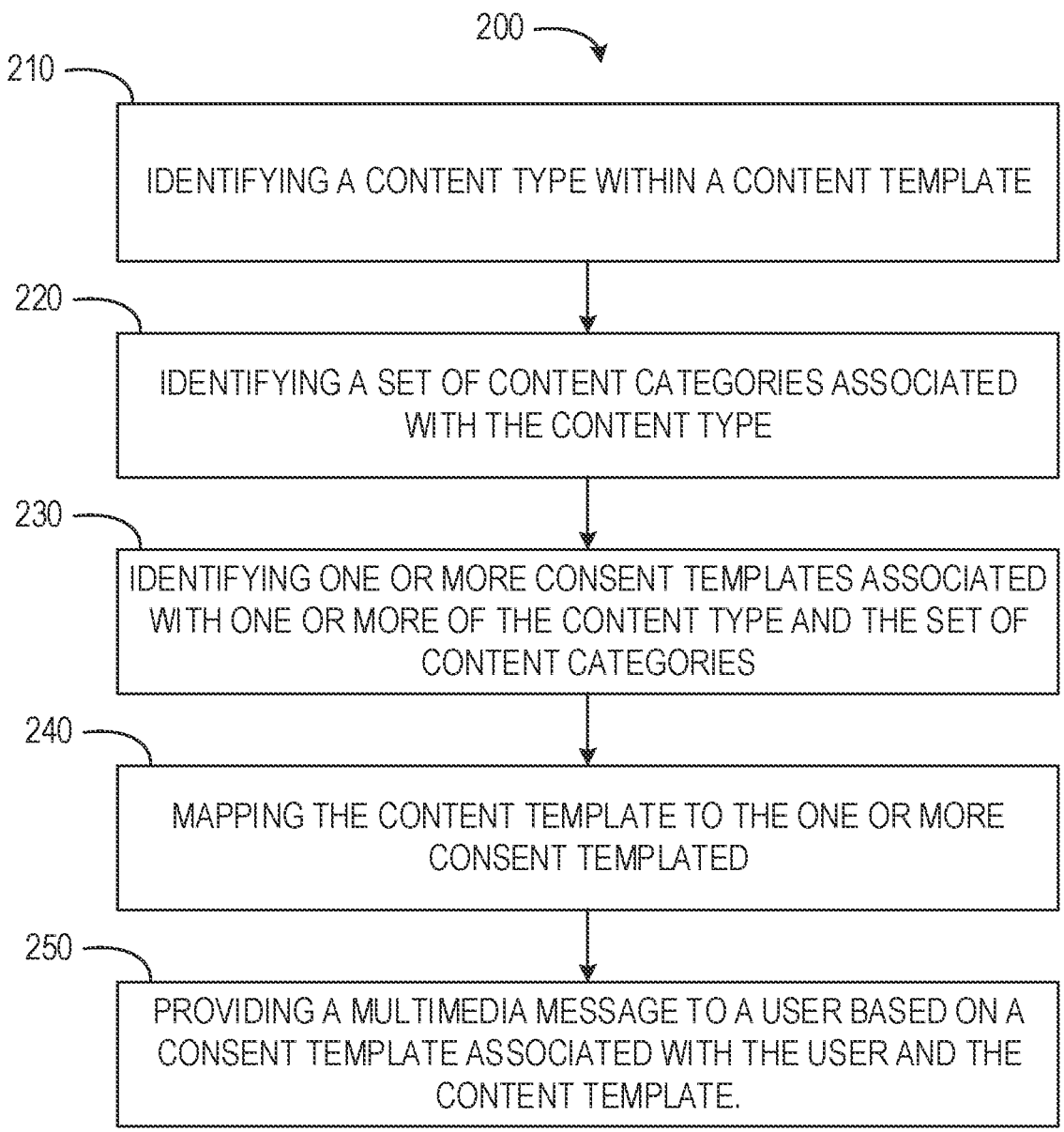
FIG. 2 depicts a flow diagram of a computer-implemented method for consent and content template mapping, according to at least one embodiment.

Referring now to FIG. 2, a flow diagram of a computer-implemented method 200 is shown. The computer-implemented method 200 is a method for consent and content template mapping. In some embodiments, the computer-implemented method 200 may be performed by one or more components of the computing environment 100, as described in more detail below.

At operation 210, the content component 110 identifies a content type within a content template. The content template may define content to be transmitted to a user on behalf of an entity. In some embodiments, the content template is generated by an entity as a template for SMS communications to be transmitted to a user using resources of a TSP. In some embodiments, the content component 110 identifies the content type by parsing the content template to identify one or more keywords. The one or more keywords represent the content type associated with the content template. For example, the content type may be a word such as furniture, wardrobe, entertainment or other single words. The content type may also be a set of words such as household items, home theater, general marketing, or other combinations of words. In some instances, combinations of words may form concepts.

In some embodiments, the content component 110 parses the content template to identify the content type. The content component 110 may also parse the content template to determine an entity associated with the content template.

An example content template may be represented as depicted below.

$var1 Surprise from Home Center! Upto $var2 off+extra $var3 on Furnitures in App
Content Template 1
Vibrat $var1 glow to your home with Home Center. Watch this personalized video & make shopping list $var2
Content Template 2

When the content component 110 parses content template 1, the content component 110 may identify a content type of "Furniture." The content component 110 may also identify a content type of "household." When the content component 110 parses content template 2, the content component 110 may identify a content type of "Home Center." The content component 110 may also identify a content type of "home theater," "furniture," and "household."

At operation 220, the content component 110 identifies a set of content categories associated with the content type. The content categories may include words and concepts under which the content types or keywords of the content type may be grouped. In some instances, terms designating content categories may overlap with content types or keywords used for content types. For example, content categories may include categories such as retail, household, entertainment, education, furniture, home theater, and other suitable terms.

In some embodiments, the content component 110 identifies the set of categories by accessing a knowledge graph. The knowledge graph includes a plurality of content categories. Each content category may include a set of descriptors. For example, a content category may include one or more descriptors representing content types associated with the given content category. The content component 110 may parse the one or more descriptors of each content category to identify descriptors associated with the content type. In some embodiments, the content component 110 selects one or more content categories for inclusion in the set of content categories. Selection of the set of content categories may be based on descriptors for the one or more content categories being associated with the content type. In some instances, the content component 110 parses the knowledge graph to identify entities identified for the content type and the content categories associated with the content type.

For the example content templates described above, the content component 110 may identify content categories of "furniture," "household," and "retail" for content template 1. The content component 110 may identify content categories of "furniture," "household," "home theater," "entertainment," and "retail" for content component 110.

At operation 230, the consent component 120 identifies one or more consent templates associated with one or more of the content type and the set of content categories. Consent templates may define a boundary of communications between a user and an entity. Although described with respect to consent, the consent templates may also be understood as indications of preference and thus preference templates or communication preference templates. The consent templates, preference templates, or communication preference templates may define or provide an indication of allowed types of communication, subjects of communication, categories of communication, channels of communication, combinations thereof, or other suitably defined boundaries of communication between an entity and a user. The consent templates, preference templates, or communication preference templates may be previously authorized by the user. In some embodiments, the authorization is an explicit and direct authorization of consent or preference of one or more of a communication type, subject, category, or other communication characteristic. In some instances, the authorization is implicit based on interaction of the user with certain or specified resources of the entity. Authorization for specified communications characteristics may be given to the entity, by the user, individually, in groups, or in batches.

The consent component 120 may parse the consent templates to identify entities associated with the consent templates and users associated with the consent templates. In some embodiments, the consent component 120 identifies one or more of a content type, a content category, and an entity for each consent template of a set of consent templates within a consent template graph. The consent component 120 may then identify the one or more consent templates by matching one or more of the content type and the content categories of the content template with content types or content categories of the one or more consent templates within the consent template graph. In some instances, the consent component 120 identifies the one or more consent templates based on entities associated with the one or more consent templates in the consent template graph and an entity associated with the content template.

With respect to the example content templates of content template 1 and content template 2, the consent component 120 may identify consent template 1 and consent template 2, shown below, for content template 1. The consent component 120 may identify consent template 1 and consent template 2 for content template 1 based on consent template 1 being associated with "furniture" offers and consent template 2 being associated with "retail marketing" offers. Similarly, the consent component 120 may identify consent templates 2, 3, and 4, shown below, for content template 2.

The consent component 120 may identify consent templates 2, 3, and 4 for content template 2 based on consent template 2 being associated with "retail marketing" offers, consent template 3 being associated with "Home Theater" offers, and consent template 4 being associated with "Entertainment" offers.

Consent acquisition template for furniture offers
    Consent Template 1
Consent acquisition template for retail marketing offers
    Consent Template 2
Consent acquisition template for Home Theater offers
    Consent Template 3
Consent acquisition template for Entertainment offers
    Consent Template 4

In some instances, the consent template is approved or established based on creation of a relationship between a user and an entity. The consent templates, defining the boundary of communications, may act as a permission or authorization to allow or deny a communication intended for a user. In some embodiments, users may generate consent data. The consent data may be received based on a user agreeing to receive multimedia messages according to specified types, breadth, topic, or other factors. In some instances, the consent component 120 receives new consent templates generated by entities attempting to communicate with users.

Once established, a consent template for a user may allow the TSP to transmit a communication of a given content or content template linked to the consent template. Similarly, lack of an established consent template may preclude transmission of a communication for a given content. Content templates may not be used to generate content for transmission to a user where the content template is not linked to a valid consent template for the user. Consent templates may be stored at one or more of a TSP and an entity.

Upon receiving a new consent template, the consent component 120 identifies a similarity between the new consent template and a previous consent template within a consent template graph. Based on the similarity, the consent component 120 inserts the new consent template into the consent template graph.

At operation 240, the graph component 130 maps the content template to the one or more consent templates to generate a consent template graph. The consent template graph may be a knowledge or relationship graph linking one or more consent templates, one or more content templates, and combinations thereof. The content templates may be mapped to one or more consent templates within the consent template graph based on one or more of the content type, the content category, and the entity associated with the content template and each consent template. In some embodiments, the consent template graph is a preexisting consent template graph, from which the one or more consent templates were identified in operation 230. In such cases, the content template may be added to the existing consent template graph by mapping the content template to the one or more consent templates.

In some embodiments, new content templates may be added under existing consent templates without re-acquiring consent. In such instances, the new content templates may be added where they are sufficiently related to the existing consent templates based on a content type and a content category of the new content template.

In some instances, content templates may be tagged or linked to a plurality of consent templates. In such instances, a content template may be used where one linked consent template has been revoked, so long as at least one other linked consent template remains valid and in effect. For example, a specified first content template may be reused where the first content template has a smaller scope and an intended message has a wider scope if the consent linked to the first content template has a wider scope, such that the scope of the intended message corresponds to the scope of the consent template.

With respect to the example content templates and consent templates, content template 1, content type of "Furniture," and content categories of "furniture," "household," and "retail" may be mapped to consent templates 1 and 2 within the consent template graph. Similarly, content template 2, content type of "Household," and content categories of "furniture," "household," "home theater," "entertainment," and "retail" may be mapped to consent templates 2, 3, and 4.

In some embodiments, new consent templates may be added to the consent template graph. Similarly, consent templates may be modified or updated within the consent template graph without invoking new permission or authorization requests to the user. In such embodiments, the consent component 120 may measure a semantic similarity between two consent templates. The consent component 120 may measure semantic similarity using any suitable natural language processing operations. For example, the consent component 120 may measure semantic similarity between an existing consent template and a new consent template using Word2Vec or GloVe operations to generate embeddings for the existing consent template and the new consent template. The consent component 120 may evaluate an average word embedding of all the words of the existing consent template and the new consent template. The consent component 120 may determine or measure the semantic similarity of the existing consent template and the new consent template by calculating a cosine between the embeddings of the existing consent template and the new consent template. Where the cosine similarity is greater than a similarity threshold, the new consent template may be substituted for the existing consent template to update the existing consent template. Where the cosine similarity is below the similarity threshold, the new consent template may be submitted for approval or new permission to the user. Where the new consent template is approved or substituted for the existing consent template, the graph component 130 maps the original consent data of the user to the new consent template. In some embodiments, the graph component 130 maps content templates, content types, and content categories associated with the existing consent template to the new consent template, once the new consent template is approved by the user or substituted for the existing consent template.

At operation 250, the message component 140 provides a multimedia message to a user based on a consent template associated with the user and the content template. In some embodiments, the multimedia message is received from a messaging entity attempting to pass templatized messages to a plurality of users. The multimedia message may be generated based on the content template. The multimedia message may be scrubbed against the consent template or multiple consent templates associated with the user and the content template. In some embodiments, the multimedia message is scrubbed against the consent template or multiple consent templates without revealing the consent data of the user.

In some embodiments, the multimedia message is scrubbed by accessing an active consent template list. In some embodiments, the active consent template list is a sanitized list referring to users, consent templates for the users, and content templates for the consent templates. The sanitized list may preclude access to personally identifying information of users. The active consent template list may include consent templates from the consent template graph. In some instances, the active consent template list links or points to valid consent templates of the consent template graph. The message component 140 identifies a subset of users who have provided consent for a multimedia message with content matching the multimedia message to be transmitted. The subset of users may be a portion of a set of users associated with the active consent template list.

In some instances, the message component 140 scrubs the multimedia message by accessing the active consent template list. Accessing the active consent template list may cause a component to commit a hash of all accessible messaging contact numbers for users. The component may commit a header-id and SMS. The component may identify the template corresponding to the SMS, such as the content template. The component may retrieve the relevant consent template for the content template of the SMS. For each contact number, the component may check for consent or user preference for the given header-id and content template. The component may then return a list of contact numbers of users to be contacted by the multimedia message. The message component 140 may then provide the multimedia message to users associated with the list of contact numbers.

With respect to the example content templates and consent templates, a multimedia message of "Mid-season surprise from Home Center! Upto 60% off+extra 10% on Furniture in App" may be generated based on content template 1 and consent template 2. A multimedia message of "Vibrant NEW YEAR glow to your home with Home Center. Watch this personalized video & make shopping list http://sample.com" may be generated based on content template 2 and consent template 2.

Figure 3:
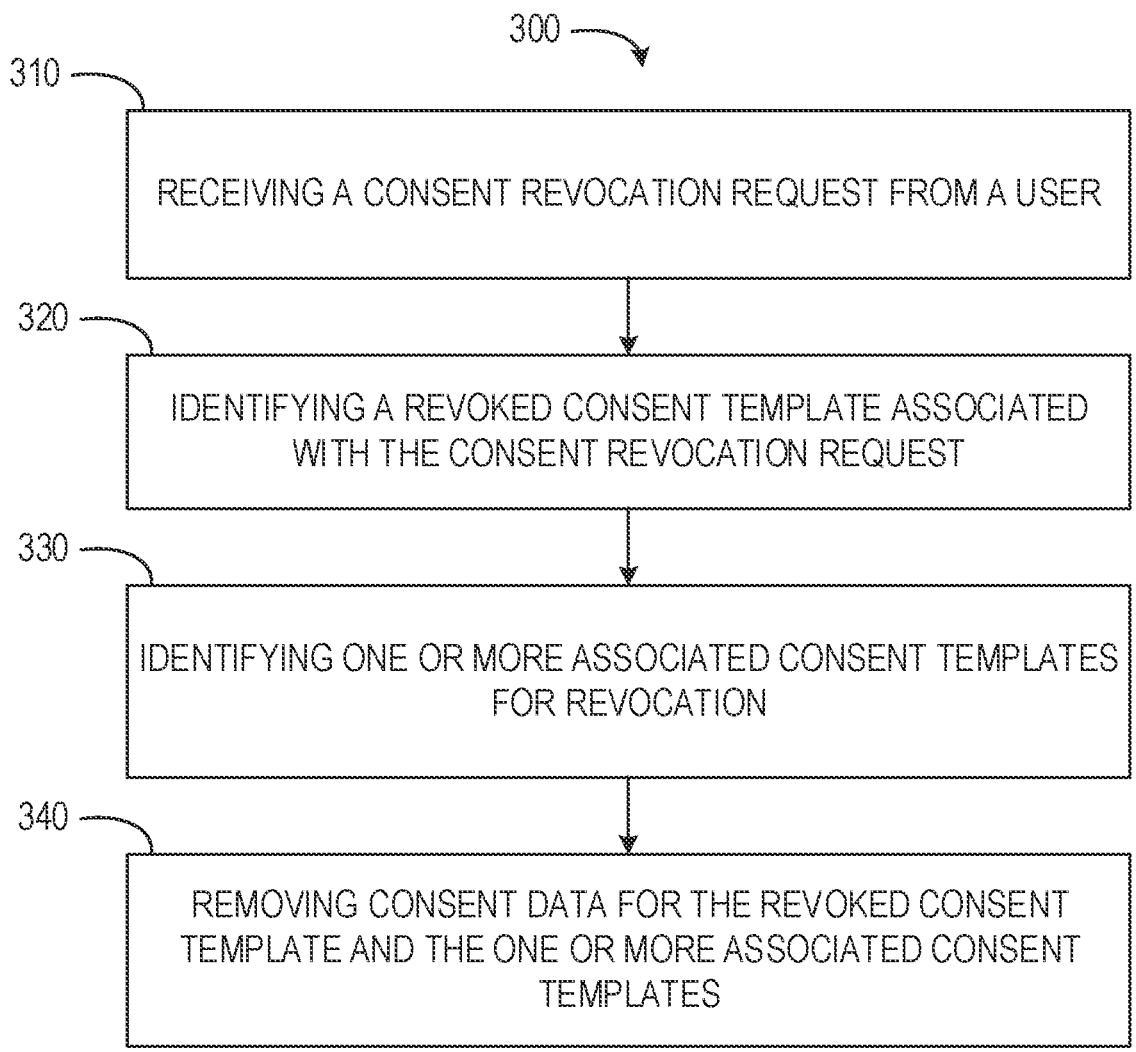
FIG. 3 depicts a flow diagram of a computer-implemented method for consent and content template mapping, according to at least one embodiment.

FIG. 3 shows a flow diagram of an embodiment of a computer-implemented method 300 for consent and content template mapping. The method 300 may be performed by or within the computing environment 100. In some embodiments, the method 300 comprises or incorporates one or more operations of the method 200.

In operation 310, the revocation component 150 receives a consent revocation request from a user. The consent revocation request may be received in response to receiving a multimedia message, such as by SMS reply to the multimedia message. The consent revocation request may be received via email, telephone call, social media, or any other suitable communication method.

In some instances, the revoked consent template is received within the revocation request based on a change in the consent template. In such instances, a change by an entity to a given consent template may cause the consent template to be revoked by one or more of the revocation component 150 and the consent component 120. In some instances, a semantically related change to a consent template may not trigger revocation of the consent template.

In operation 320, the revocation component 150 identifies a revoked consent template associated with the consent revocation request. In some embodiments, the revoked consent template is identified within a consent template graph. The revoked consent template may be a currently valid consent template. The revoked consent template may have been previously accepted or validated by the user at a time prior to the revocation component 150 receiving the consent revocation request.

In operation 330, the revocation component 150 identifies one or more associated consent templates for revocation. In some embodiments, the one or more associated consent templates are identified based on identifying the revoked consent template. The one or more associated content templates may be hierarchically related to the revoked consent template within the consent template graph. The consent template graph may be a directed graph. In some embodiments, the consent template graph is a directed graph with weighted edges extending between nodes of the directed graph. The nodes of the directed graph may be consent templates, content templates, content types, content categories, combinations thereof, or any other suitable node information.

In operation 340, the revocation component 150 removes consent data for the revoked consent template and the one or more associated consent templates. The revocation component 150 may remove consent data for the revoked consent template by removing a node from the consent template graph. In some embodiments, the revocation component 150 also revokes or removes consent data for nodes which directly and solely descend from a revoked consent template. Similarly, the revocation component 150 may remove consent data of nodes where a path between two given nodes of the consent template graph are below a threshold weight.

In some embodiments, the revocation component 150 may remove consent data for a consent template which descends from a revoked consent template and a non-revoked consent template. In such instances, the revocation component 150 may cooperate with the graph component 130 to eliminate an edge extending between the revoked consent template and the child or descendant template. The graph component 130 may also reduce a weight of an edge extending between the child or descendant template and the non-revoked consent template. In some instances, revocation of a wider scoped consent template may result in revocation of related and more limited consent templates. For example, communications based on a customer's loyalty points may be rejected if a more general consent (e.g., general marketing consent) has been revoked. In some instances, a wider scope consent template, which has been revoked, may not lead to revocation of narrower scoped consent templates. In such instances, the narrower scoped consent templates may remain linked to a valid consent template.

Figure 4:
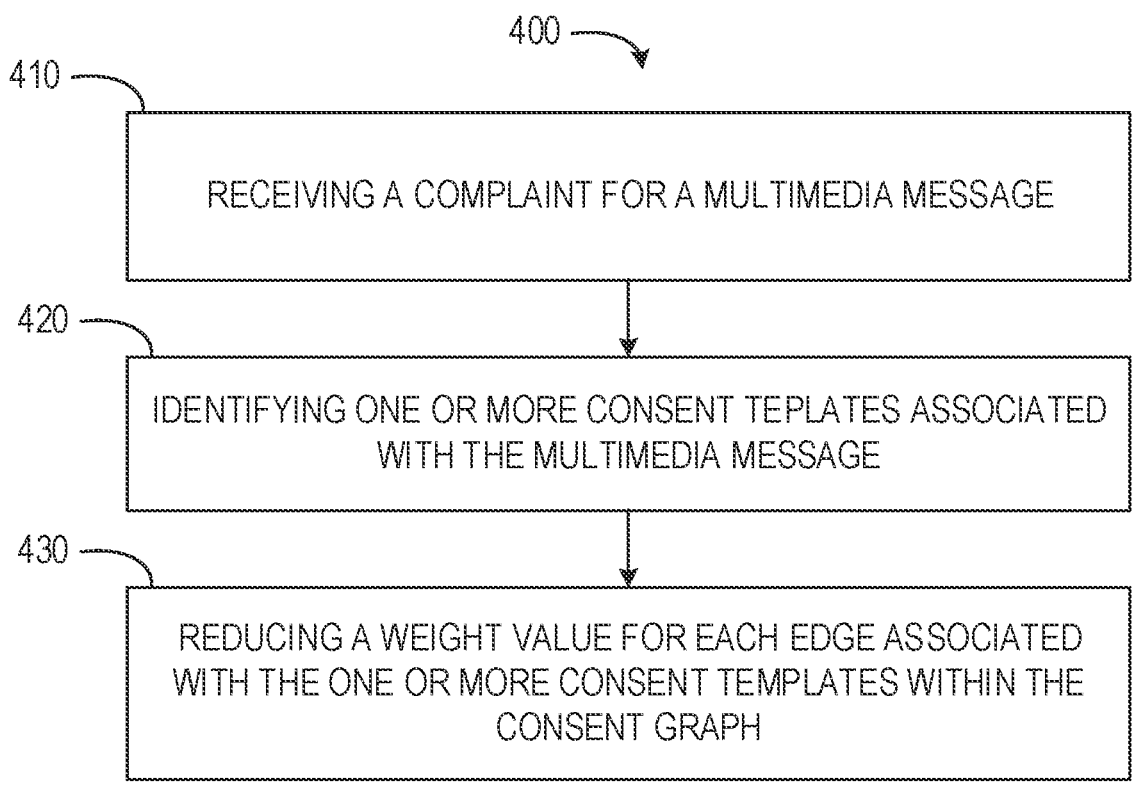
FIG. 4 depicts a flow diagram of a computer-implemented method for consent and content template mapping, according to at least one embodiment.

FIG. 4 shows a flow diagram of an embodiment of a computer-implemented method 400 for consent and content template mapping. The method 400 may be performed by or within the computing environment 100. In some embodiments, the method 400 comprises or incorporates one or more operations of the method 200. In some instances, operations of the method 400 may be incorporated as part of or sub-operations of the method 200.

In operation 410, the complaint component 160 receives a complaint for a multimedia message. In some embodiments, the multimedia message is generated from an associated content template. The complaint may be received from a user receiving the multimedia message. In some embodiments, the complaint may be received as a response or reply to the multimedia message. The complaint may also be received in any other suitable format such as email, social media, telephone call, or any other suitable method.

In operation 420, the complaint component 160 identifies one or more consent templates associated with the multimedia message. The one or more consent templates may be identified based on the associated content template and the consent template graph. In some embodiments, the consent templates are maintained in a hierarchical graph, such as a consent template directed graph. The consent templates may be maintained in the hierarchical graph by processing the consent templates using a domain specific knowledge graph, as discussed above with respect to the method 200. In maintaining the graph of consent templates, the consent component 120 may maintain weights on the consent templates. The consent template directed graph may maintain weights by establishing initial weights between consent templates and content templates based on permissions received from the user and similarities of the consent templates and content templates. For example, an initial weight for an edge may be a weight of one.

In some embodiments, the one or more consent templates are identified based on metadata contained within or associated with the multimedia message. In some instances, upon receiving the complaint indicating the multimedia message at issue, the complaint component 160 identifies the user, the content of the multimedia message, and based on the user and the content of the message, determines one or more consent templates associated with the multimedia message based on the hierarchical graph of consent templates.

In operation 430, the graph component 130 reduces a weight value for each edge associated with the one or more consent templates within the consent template graph. The weight may be decremented for edges between consent templates, between consent templates and content templates, or between content templates. With each complaint received, the graph component 130 may decrement the edge and reduce a likelihood that a given consent template, content template, or multimedia message is used again or used with relative frequency. The weights may be decremented by a portion of the initial weight. For example, for each complaint, a weight for each associated edge may be decremented by a percentage of the initial weight, a fraction (e.g., 0.1 or 0.3) of the initial weight, or any other suitable value.

Figure 5:
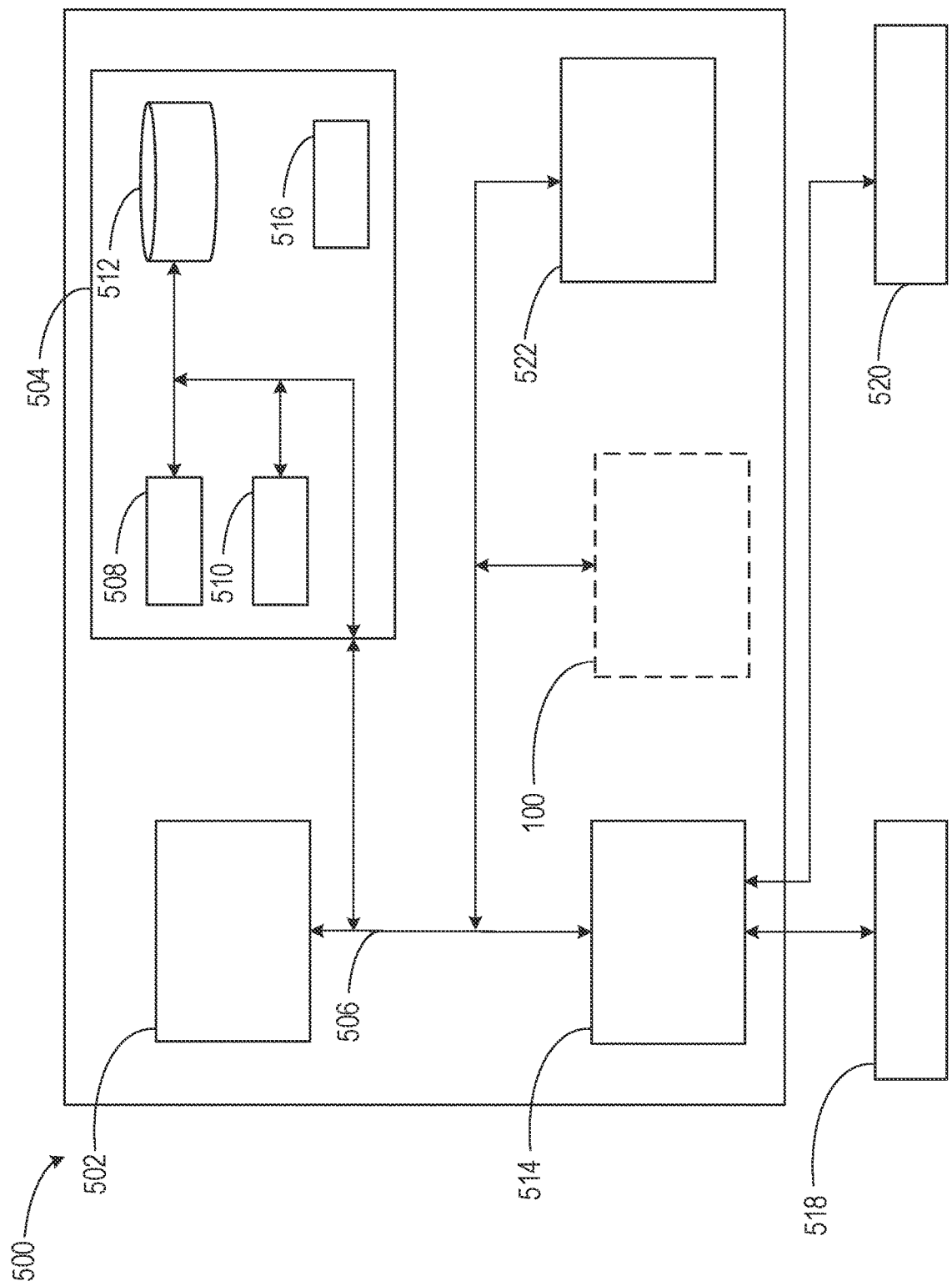
FIG. 5 depicts a block diagram of a computing system for consent and content template mapping, according to at least one embodiment.

Embodiments of the present disclosure may be implemented together with virtually any type of computer, regardless of the platform is suitable for storing and/or executing program code. FIG. 5 shows, as an example, a computing system 500 (e.g., cloud computing system) suitable for executing program code related to the methods disclosed herein and for consent and content template mapping.

The computing system 500 is only one example of a suitable computer system and is not intended to suggest any limitation as to the scope of use or functionality of embodiments of the present disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors 502 (e.g., processing units), a system memory 504 (e.g., a computer-readable storage medium coupled to the one or more processors), and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, the system memory 504 may include at least one program product having a set (e.g., at least one) of program modules that are configured to carry out the functions of embodiments of the present disclosure.

The program/utility, having a set (at least one) of program modules 516, may be stored in the system memory 504 by way of example, and not limiting, as well as an operating system, one or more application programs, other program modules, and program data. Program modules may include one or more of the content component 110, the consent component 120, the graph component 130, the message component 140, the revocation component 150, and the complaint component 160, which are illustrated in FIG. 1. Each of the operating systems, one or more application programs, other program modules, and program data or some combination thereof, may include an implementation of a networking environment. Program modules 516 generally carry out the functions and/or methodologies of embodiments of the present disclosure, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 6:
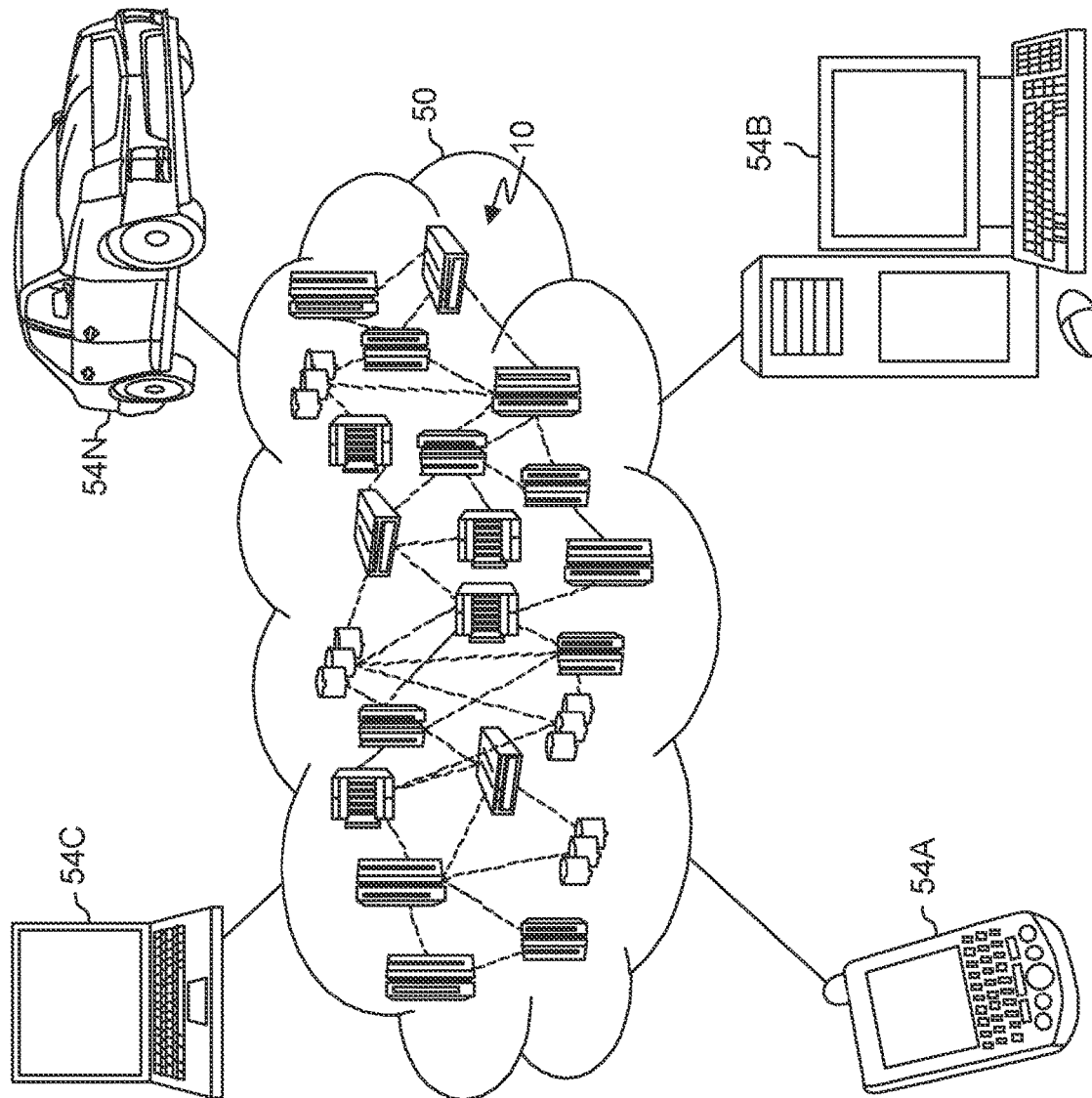
FIG. 6 is a schematic diagram of a cloud computing environment in which concepts of the present disclosure may be implemented, in accordance with an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
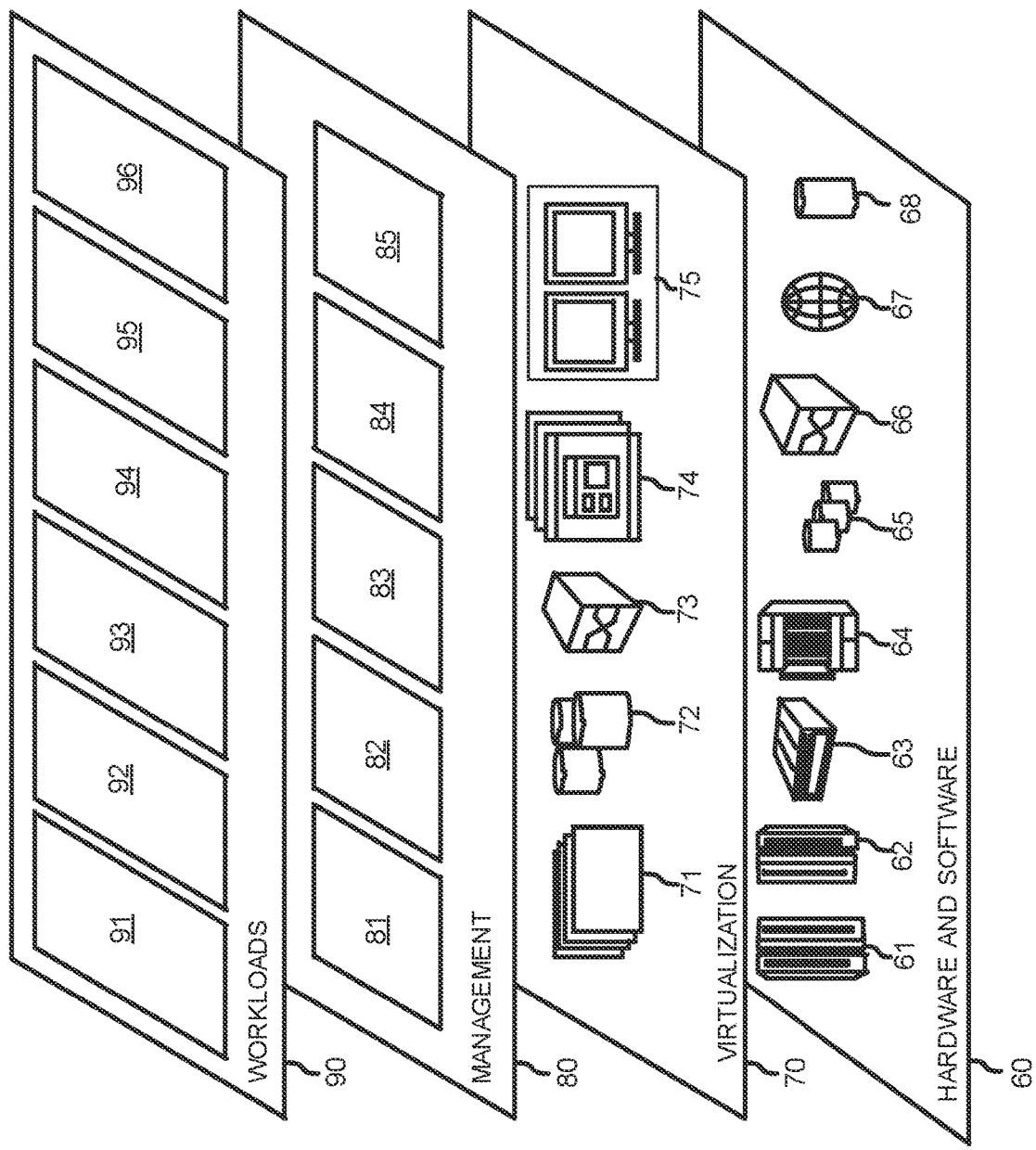
FIG. 7 is a diagram of model layers of a cloud computing environment in which concepts of the present disclosure may be implemented, in accordance with an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multimedia messaging processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying a content type within a content template, wherein the content template is a template for a message to be transmitted to a user;
   identifying a set of content categories associated with the content type;
   identifying one or more consent templates associated with one or more of the content type and the set of content categories, the consent templates indicating at least one of allowed types of communication, subjects of communication, categories of communication, channels of communication and boundaries of communication, between an entity and a user;
   mapping the content template to the one or more consent templates to generate a consent template graph;
   removing data from the message based on the one or more consent templates, the content template, and the consent template graph, resulting in a scrubbed message; and
   transmitting the scrubbed message to the user.

2. The method of claim 1, wherein identifying the content type within the content template further comprises:
   parsing the content template to identify one or more keywords representing the content type.

3. The method of claim 1, wherein identifying the set of content categories further comprises:
   accessing a knowledge graph including a plurality of content categories with one or more descriptors;
   parsing the one or more descriptors of each content category to identify descriptors associated with the content type; and
   selecting one or more content categories for inclusion in the set of content categories based on descriptors for the one or more content categories being associated with the content type.

4. The method of claim 1, wherein the consent template graph is generated for a user, the method further comprising:
   receiving a consent revocation request from the user;
   identifying a revoked consent template associated with the consent revocation request, the revoked consent template being identified within the consent template graph;
   based on identifying the revoked consent template, identifying one or more associated consent templates for revocation, the one or more associated content templates being hierarchically related to the revoked consent template within the consent template graph; and
   removing consent data for the revoked consent template and the one or more associated consent templates.

5. The method of claim 1, further comprising:
   receiving a complaint for a multimedia message, the multimedia message being generated from an associated content template;
   identifying one or more consent templates associated with the multimedia message based on the associated content template and the consent template graph; and
   reducing a weight value for each edge associated with the one or more consent templates within the consent template graph.

6. The method of claim 1, further comprising:
   receiving a new consent template;
   identifying a similarity between the new consent template and a previous consent template within the consent template graph; and
   based on the similarity, inserting the new consent template into the consent template graph.

7. The method of claim 1, further comprising:
   receiving the message, wherein the message is a multimedia message; and
   providing the multimedia message to a user based on a consent template associated with the user and the content template.

8. A system, comprising:
   one or more processors; and
   a computer-readable storage medium, coupled to the one or more processors, storing program instructions that, when executed by the one or more processors, cause the one or more processors to perform operations comprising:
   identifying a content type within a content template, wherein the content template is a template for a message to be transmitted to a user;
   identifying a set of content categories associated with the content type;
   identifying one or more consent templates associated with one or more of the content type and the set of content categories, the consent templates indicating at least one of allowed types of communication, subjects of communication, categories of communication, channels of communication and boundaries of communication, between an entity and a user;
   mapping the content template to the one or more consent templates to generate a consent template graph;

removing data from the message based on the one or more consent templates, the content template, and the consent template graph, resulting in a scrubbed message; and transmitting the scrubbed message to the user.

9. The system of claim 8, wherein identifying the content type within the content template further comprises:

parsing the content template to identify one or more keywords representing the content type.

10. The system of claim 8, wherein identifying the set of content categories further comprises:

accessing a knowledge graph including a plurality of content categories with one or more descriptors;

parsing the one or more descriptors of each content category to identify descriptors associated with the content type; and selecting one or more content categories for inclusion in the set of content categories based on descriptors for the one or more content categories being associated with the content type.

11. The system of claim 10, wherein the consent template graph is generated for a user, the operations further comprising:

receiving a consent revocation request from the user;

identifying a revoked consent template associated with the consent revocation request, the revoked consent template being identified within the consent template graph;

based on identifying the revoked consent template, identifying one or more associated consent templates for revocation, the one or more associated content templates being hierarchically related to the revoked consent template within the consent template graph; and removing consent data for the revoked consent template and the one or more associated consent templates.

12. The system of claim 11, wherein the operations further comprise:

receiving a complaint for a multimedia message, the multimedia message being generated from an associated content template;

identifying one or more consent templates associated with the multimedia message based on the associated content template and the consent template graph; and reducing a weight value for each edge associated with the one or more consent templates within the consent template graph.

13. The system of claim 8, wherein the operations further comprise:

receiving a new consent template;

identifying a similarity between the new consent template and a previous consent template within the consent template graph; and based on the similarity, inserting the new consent template into the consent template graph.

14. The system of claim 13, wherein the operations further comprise:

receiving the message, wherein the message is a multimedia message; and providing the multimedia message to a user based on a consent template associated with the user and the content template.

15. A computer program product comprising a computer readable storage medium having program instructions embodied therewith, the program instructions being executable by one or more processors to cause the one or more processors to perform operations comprising:

identifying a content type within a content template, wherein the content template is a template for a message to be transmitted to a user;

identifying a set of content categories associated with the content type;

identifying one or more consent templates associated with one or more of the content type and the set of content categories, the consent templates indicating at least one of allowed types of communication, subjects of communication, categories of communication, channels of communication and boundaries of communication, between an entity and a user;

mapping the content template to the one or more consent templates to generate a consent template graph;

removing data from the message based on the one or more consent templates, the content template, and the consent template graph, resulting in a scrubbed message; and transmitting the scrubbed message to the user.

16. The computer program product of claim 15, wherein identifying the set of content categories further comprises:

accessing a knowledge graph including a plurality of content categories with one or more descriptors;

parsing the one or more descriptors of each content category to identify descriptors associated with the content type; and selecting one or more content categories for inclusion in the set of content categories based on descriptors for the one or more content categories being associated with the content type.

17. The computer program product of claim 15, wherein the consent template graph is generated for a user, the operations further comprising:

receiving a consent revocation request from the user;

identifying a revoked consent template associated with the consent revocation request, the revoked consent template being identified within the consent template graph;

based on identifying the revoked consent template, identifying one or more associated consent templates for revocation, the one or more associated content templates being hierarchically related to the revoked consent template within the consent template graph; and removing consent data for the revoked consent template and the one or more associated consent templates.

18. The computer program product of claim 15, wherein the operations further comprise:

receiving a complaint for a multimedia message, the multimedia message being generated from an associated content template;

identifying one or more consent templates associated with the multimedia message based on the associated content template and the consent template graph; and reducing a weight value for each edge associated with the one or more consent templates within the consent template graph.

19. The computer program product of claim 15, wherein the operations further comprise:

receiving a new consent template;

identifying a similarity between the new consent template and a previous consent template within the consent template graph; and based on the similarity, inserting the new consent template into the consent template graph.

20. The computer program product of claim 15, wherein the operations further comprise:

receiving the message, wherein the message is a multimedia message; and providing the multimedia message to a user based on a consent template associated with the user and the content template.

\* \* \* \* \*